Jan. 13, 1959

C. K. STROBEL ET AL 2,868,928

TEMPERATURE CONTROL DEVICES

Filed July 2, 1957

INVENTORS.
Charles K. Strobel
& Guy F. Conner
BY
Albert J. Henderson
THEIR ATTORNEY.

Jan. 13, 1959 C. K. STROBEL ET AL 2,868,928
TEMPERATURE CONTROL DEVICES
Filed July 2, 1957 2 Sheets-Sheet 2

INVENTORS.
Charles K. Strobel &
Guy F. Conner
BY

*Albert J. Henderson*
THEIR ATTORNEY.

United States Patent Office 2,868,928
Patented Jan. 13, 1959

2,868,928

TEMPERATURE CONTROL DEVICES

Charles K. Strobel, Pittsburgh, and Guy F. Conner, West Mifflin, Pa., assignors to Robertshaw-Fulton Controls Company, Greensburg, Pa., a corporation of Delaware Application July 2, 1957, Serial No. 669,640

5 Claims. (Cl. 200—140)

This invention relates to temperature control devices and more particularly to a thermostatic control for room or space application.

Thermostatic controls of the hydraulic or fluid-filled type customarily embody a bulb or reservoir for the thermal fluid connected to an actuating element which may comprise an expansible and contractible capsule or bellows. Such fluid-type thermostats have been adapted in this invention for room or space temperature control with particular attention to securing the required degree of sensitivity and accuracy.

It is therefore an object of this invention to utilize the advantageous characteristics of fluid-filled thermal elements in a room temperature control.

Another object of the invention is to secure the requisite sensitivity to ambient temperature changes while maintaining relative stability in response over long periods of operation.

Another object of the invention is to simplify the various constructional details while retaining all required control features.

These and other objects and advantages are obtained by providing a thin-walled flat reservoir, either rectangular or cylindrical in form, for the thermal fluid and thus obtaining good heat transfer from the surrounding atmosphere. A bellows actuator is employed in conjunction with the reservoir and has a relatively small cross-sectional area perpendicular to the direction of its motion to obtain relatively large movement for relatively small changes in volume of the thermal fluid. The bellows actuator in these embodiments of the invention is connected to operate contacts in an electric circuit and a lever system is employed to multiply the bellows movement. The reservoir lends itself to use as part of a bracket to support the entire mechanism or may act at one side of a housing for the control mechanism.

Figure 1:
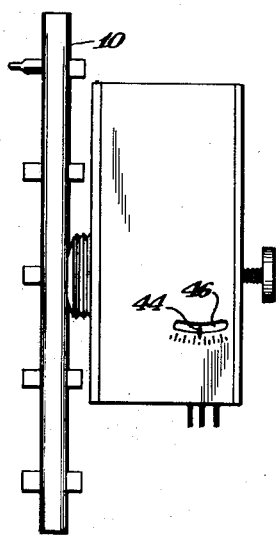
Fig. 1 is a side elevation of a room temperature regulator embodying the invention.
Figure 2:
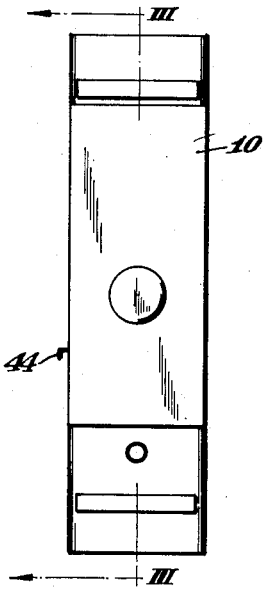
Fig. 2 is a front elevation of the regulator shown in Fig. 1.
Figure 3:
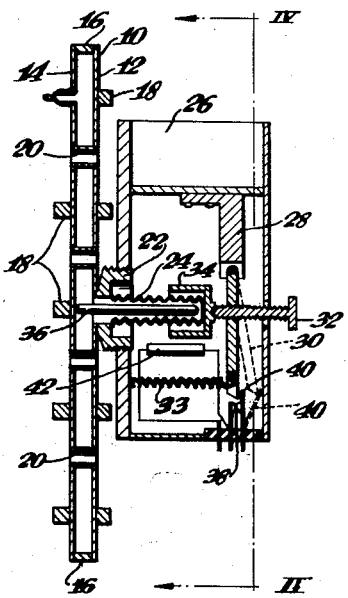
Fig. 3 is a section taken on the line III—III of Fig. 2.
Figure 4:
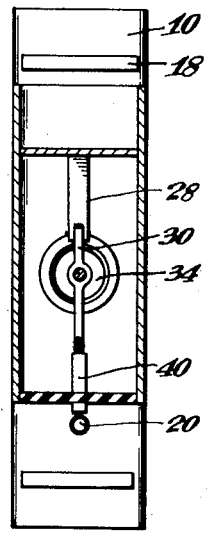
Fig. 4 is a section taken on the line IV—IV of Fig. 3.

Referring now more particularly to Figs. 1–4, the temperature control device shown in this embodiment comprises a closed container 10 for a thermally expansible fluid, such as xylene, Dow Corning Silicone (DC–500), or any other fluid having the desired characteristics. The container 10 has rectangular side walls 12, 14 of thin sheet material, such as copper, and are spaced in proximate relation by relatively thicker end walls 16. A convenient means for forming the container 10 is by flattening a section of copper tubing and closing the ends by means of the end wall portions 16. However, it will be understood that other means may be employed for constructing the container 10 including stampings made from rectangular sheets of suitable material.

Preferably the inside spacing between the side walls 12, 14 of the container 10 is about 1/16 inch. Thus, the reservoir so formed has a desirable large ratio of surface to volume but requires some strengthening to prevent change of shape when the thermal fluid expands. To this end, a plurality of stiffening sections or braces 18 are secured by soldering or other suitable means to the outer surface of the walls 12, 14 in suitably spaced locations. It will be understood that the additional support could also be obtained by corrugations, either plain or crossed or otherwise formed, in the surface of the walls 12, 14. It is apparent that the braces 18 or other suitable strengthening means also serve to improve the ratio of surface to volume for the container 10. Additional strengthening may be imparted to the container 10 by the provision of vent tubes 20 extending through the container 10 from one side wall 12 to the other side wall 14 and providing for free flow of ambient air around the container 10.

The median portion of the side wall 12 is apertured for the reception of an annular member or spud 22 which is secured to the apertured wall by soldering or other suitable means. The spud 22 projects exteriorly of the container 10 and provides for egress of fluid from the median portion thereof. A hollow expansible and contractible corrugated element or bellows 24 is secured at one end by soldering or other suitable means to the spud 22 and provides a closure for the apertured wall 12 of the container 10. As will be apparent, the opposite or free end of the bellows 24 is movable upon expansion and contraction of the bellows 24 due to changes in volume of the fluid therein. The bellows 24 forms the actuating element of the temperature control device and is constructed and arranged to obtain a large bellows movement for expansion or contraction of the filler fluid.

To this end, the bellows 24 is provided with a relatively small cross-sectional area perpendicular to the direction of movement toward and away from the container 10. It is important to note that to obtain a relatively large bellows movement the cross-sectional area must be relatively small perpendicular to the direction of motion. It is not sufficient to specify a relatively small volume for the bellows 24. For example, a diaphragm element having practically zero volume with the wafers compressed and a cross-sectional area of one square inch, would show only about a .01 inch linear movement for a volume change of the bulb fluid of .01 cubic inch. On the other hand, a bellows actuator having a much larger volume with a cross-section of .03 square inch would show a linear movement of about 1/3 inch for a volume change of .01 cubic inch in the bulb fluid. In this embodiment, the bellows 24 is approximately 1/4 inch O. D. by .8125 inch long by 24 corrugations by .03 square inch cross-sectional area. The location of the bellows 24 on the centerline of one of the side walls, such as wall 12, of the container 10 provides for rapid flow of the fluid between the container 10 and the bellows 24.

The longitudinal movement of the outer end of the bellows 24 as described is utilized for operating a control system in accordance with variations in temperature sensed by the container 10. To this end, the outer wall of the annular spud 22 may be threaded for the reception of a housing 26 which extends over the bellows 24 and carries a support arm 28. The support arm 28 forms part of a lever system which is used to multiply the motion of the bellows 24 and includes a lever arm 30 pivoted at one end on the support arm 28. The opposite end of the lever arm is biased toward the bellows 24 by a coil spring 33 extending between the lever arm 30 and an adjacent wall of the housing 26. An adjustment screw 32 threadedly engages the lever 30 and extends outwardly of the container 26 for manual adjustment of the temperature setting. The opposite end of the screw 32 engages a cap 34 which is carried on the movable end of the bellows 24 and extends partly thereover. It will be apparent that the cap 34 could be extended to engage the spud 22 and provide a bellows stop and guide. However, in this embodiment, a stop pin 36 is employed for this purpose and extends through the bellows 24 from the movable end thereof to the wall 14 of the container 10.

In this instance, the control system is electrical and includes a pair of contacts 38 suitably insulated from the housing 26 and positioned for operation by the lever 30. Preferably one of the contacts 38 is supported on a switch blade 40 having an extended end which is engageable by the lever 30 and is spaced sufficiently from the adjacent wall of the housing 26 to provide overshoot travel after the contacts 38 are opened and thus absorb excess movement of the bellows 24 without damage.

The temperature regulator may embody an anticipating heater in the form of a resistor element 42 positioned in the housing 26 adjacent the bellows 24 for heating the fluid therein. The resistor 42 is connected in the electrical circuit by having one end connected to one of the contacts 38 and the opposite end connected to a terminal extending through the insulated portion of the housing 26. Since heat anticipation of this type is well known in the art, further description is deemed unnecessary, it being sufficient to point out that the resistor 42 heats only part of the thermal fluid (that contained in bellows 24) as is customary in such arrangements.

It should be observed that other actuating means may be employed in place of the bellows 24. For example, the cap 34 could be extended to provide a closed container and the fluid from the container 10 could be confined between the cap 34 and the bellows 24 instead of inside the latter. Such alternative arrangements of bellows actuators are well known in the art and further description and illustration are deemed unnecessary.

Suitable indicating means may be employed for the temperature regulator and, in this embodiment, take the form of a pointer 44 secured to the lever 30 and projecting exteriorly of the housing 26 through an arcuate slot 46 formed in the wall of the housing 26. Suitable temperature indicia are marked on the wall of the housing 26 adjacent the slot 46 to provide the necessary temperature indication in conjunction with the pointer 44.

The operation of the regulator will be apparent from the foregoing description. The flat thin-walled container 10 is highly sensitive to variations in temperature in the room or other space where variations in the temperature of the surrounding atmosphere are to be sensed. The consequent expansion of the fluid in the container 10 serves to actuate the free end of the bellows 24 and cause pivotal movement of the lever 30 to open the contacts 38. When such contacts are connected in an electrical circuit for controlling a furnace or other heating means for the room or space, such apparatus ceases to produce heat until the temperature drops sufficiently to cause contraction of the fluid in the container 10 and consequent contraction of the bellows 24 for closing the contacts 38.

It will be observed that a small volume change of the fluid in the container 10 will produce a relatively large movement of the free end of the bellows 24. Under test in a water bath with a dial gauge on the bellows actuator, the gauge deflection was about .002 inch per degree F. in a room temperature range of 60–90° F. Thus, the container 10 has a desirable large ratio of surface to volume and provides good heat transfer between the thermal fluid and the surrounding atmosphere.

Figure 5:
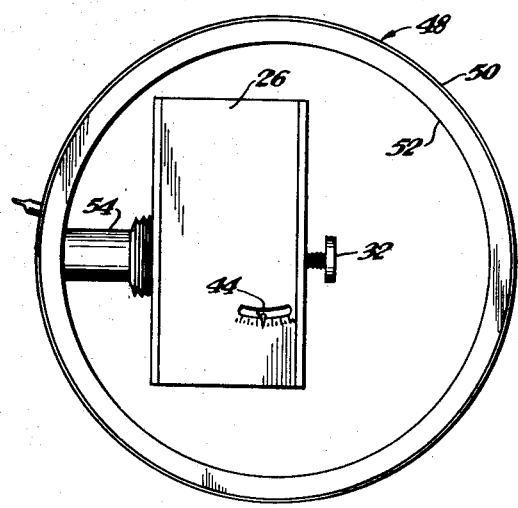
Fig. 5 is a front elevation of another embodiment.
Figure 6:
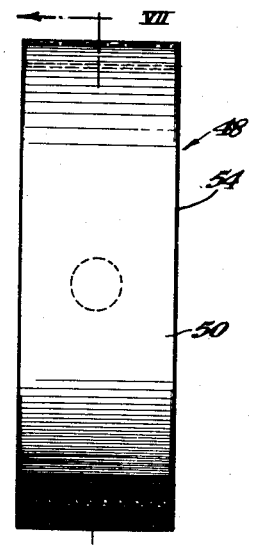
Fig. 6 is a side elevation of the embodiment shown in Fig. 5.
Figure 7:
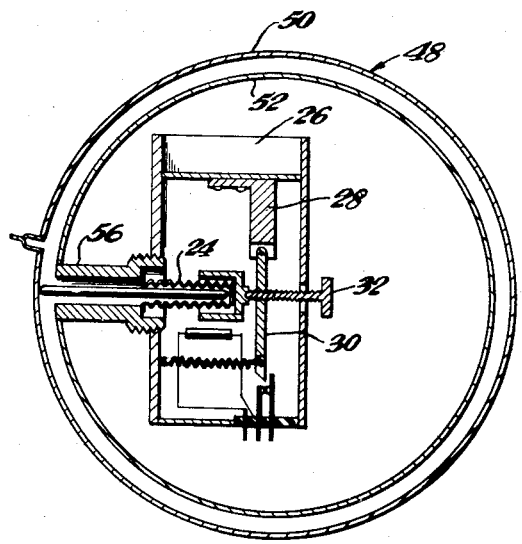
Fig. 7 is a section taken along the line VII—VII of Fig. 6.

The alternative embodiment, shown in Figs. 5–7, utilizes a different type of reservoir for the thermal fluid but otherwise has parts corresponding to those of the previously described embodiment and similar reference numerals have been employed for such parts. The alternative embodiment employs a hollow cylindrical container 48 having opposite side walls 50, 52 of a flat thin material, such as copper, and spaced by end walls 54 in proximate relation approximately $\frac{1}{16}$ inch apart. Since the hollow cylindrical container 48 is inherently strong, it requires no surface braces or corrugations which were preferably employed in connection with the previously described embodiment. However, while the diameter is comparable to the length of container 10, it is apparent that the volume of the container 48 is considerably larger but still maintains a high ratio of surface to volume. Due to the larger volume of fluid, the container 48 shows a much greater movement of the bellows 24 for each degree of temperature than in the previously described embodiment.

An annular support 56 takes the place of the spud 22 of the previously described embodiment but is also connected to a median portion of the inner wall 52 of the container 48 to provide for rapid flow of the fluid between the container 48 and the bellows 24. Since the remaining elements of the temperature regulator, Figs. 5–7, may be identical with those previously described in connection with Figs. 1–4, further description is deemed unnecessary.

It should be noted that the container 10 and the container 48 of the two embodiments described both serve as part of a bracket to support the thermostat mechanism and the housing 26. However, the container 10 obviously might serve as one side of the thermostat housing in which the mechanism would be mounted. Likewise, the container 48 might be part of a cylindrical housing provided with front and back walls. In either arrangement, the additional walls of the housing should be appropriately ventilated.

While two embodiments of the invention have been shown and described, it will be apparent that many changes may be made in the details of construction and arrangement of parts without departing from the scope of the invention as defined in the appended claims.

We claim:

1. In a temperature control device, a closed container for thermally expansible fluid having a pair of side walls, one of said side walls having an aperture therein, said side walls being of thin sheet material and spaced in proximate relation to each other forming a thin elongated reservoir substantially rectangular in cross-section, and an expansible and contractible element secured at one end to said one side wall adjacent said aperture and subject to volumetric changes in the fluid, the opposite end of said element being movable upon expansion and contraction of said element upon said changes, said element having a small cross-sectional area perpendicular to the direction of said movement relative to the distance between said ends thereof to produce a relatively large longitudinal movement upon expansion and contraction of the fluid.

2. In a temperature control device, a closed container for thermally expansible fluid having a pair of side walls, one of said side walls having an aperture therein, said aperture being located in a medial portion of said one side wall, said side walls being of thin sheet material and spaced in proximate relation to each other forming a thin elongated reservoir substantially rectangular in cross-section, and a hollow expansible and contractible corrugated element secured at one end to said one side wall and communicating with said aperture for receiving fluid from said medial portion, the opposite end of said element being movable upon expansion and contraction of said element upon changes in volume of the fluid, said element having a small cross-sectional area perpendicular to the direction of said movement relative to the distance between said ends thereof to produce a relatively large longitudinal movement upon expansion and contraction of the fluid.

3. In a temperature control device, a closed container for thermally expansible fluid having a pair of side walls, one of said side walls having an aperture therein, said aperture being located in a medial portion of said one side wall, said side walls being of thin sheet material and spaced in proximate relation to each other forming a thin elongated reservoir substantially rectangular in cross-section, a hollow expansible and contractible corrugated element secured at one end to said one side wall and communicating with said aperture for receiving fluid from said medial portion, lever means operably connected to the opposite end of said element, said opposite end being movable upon expansion and contraction of said element upon changes in volume of the fluid for operating said lever means, and control means biased to one controlling position and supported for operation to another position by said lever means, said element having a small cross-sectional area perpendicular to the direction of said movement relative to the length of said element to produce a relatively large longitudinal movement for operation of said lever means upon expansion and contraction of said fluid.

4. In a temperature control device, a closed container for thermally expansible fluid having a pair of side walls, one of said side walls having an aperture therein, said aperture being located in a medial portion of said one side wall, said side walls being of thin sheet material and spaced in proximate relation to each other forming a thin elongated reservoir substantially rectangular in cross-section, a hollow expansible and contractible corrugated element secured at one end to said one side wall and communicating with said aperture for receiving fluid from said medial portion, switch lever means operably connected to the opposite end of said element, said opposite end being movable upon expansion and contraction of said element upon changes in volume of the fluid for operating said lever means, and switch means having normally closed contacts supported for operation to open position by said lever means, said element having a small cross-sectional area perpendicular to the direction of said movement relative to the length of said element to produce a relatively large longitudinal movement for operation of said lever means upon expansion and contraction of said fluid.

5. A temperature control device as claimed in claim 4 wherein said container is constructed and arranged with a large ratio of surface to volume, said side walls including support means to prevent change of shape of said container upon said changes in volume of the fluid.

References Cited in the file of this patent

UNITED STATES PATENTS

| | | |
|---|---|---|
| 1,907,869 | Raney | May 9, 1933 |
| 1,978,362 | Fonseca | Oct. 23, 1934 |
| 2,475,343 | Wellman | July 5, 1949 |